C. W. DAVIS.
WATTMETER.
APPLICATION FILED OCT. 19, 1914.

1,210,609.

Patented Jan. 2, 1917.
3 SHEETS—SHEET 1.

WITNESSES
J. Herbert Bradley.
Francis J. Tomasson.

INVENTOR
Charles W. Davis
by Christy and Christy
his attorneys.

C. W. DAVIS.
WATTMETER.
APPLICATION FILED OCT. 19, 1914.

1,210,609.

Patented Jan. 2, 1917.
3 SHEETS—SHEET 2.

C. W. DAVIS.
WATTMETER.
APPLICATION FILED OCT. 19, 1914.
1,210,609.
Patented Jan. 2, 1917.
3 SHEETS—SHEET 3.
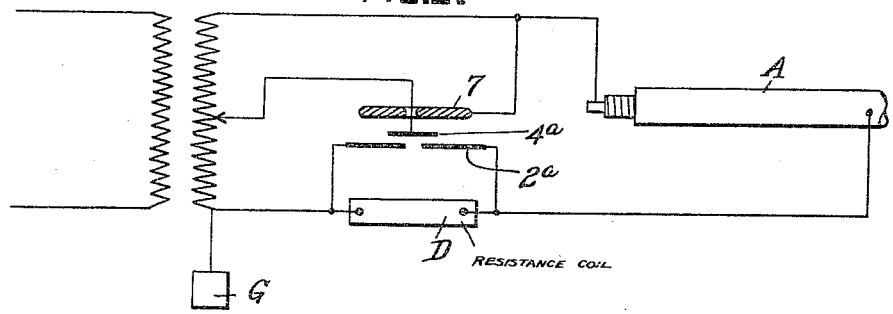
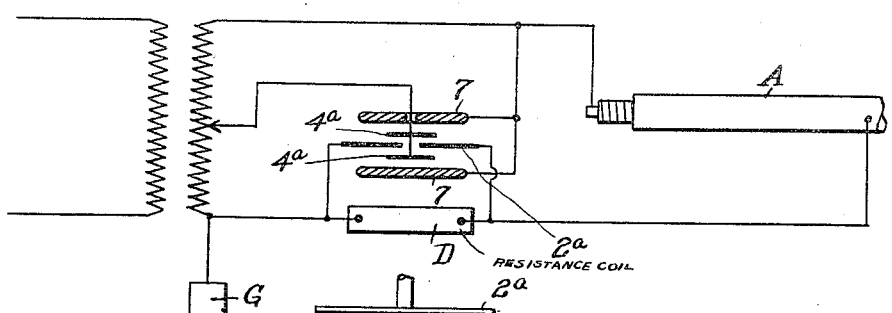
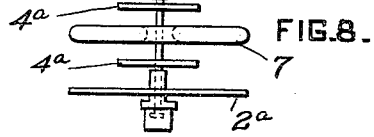
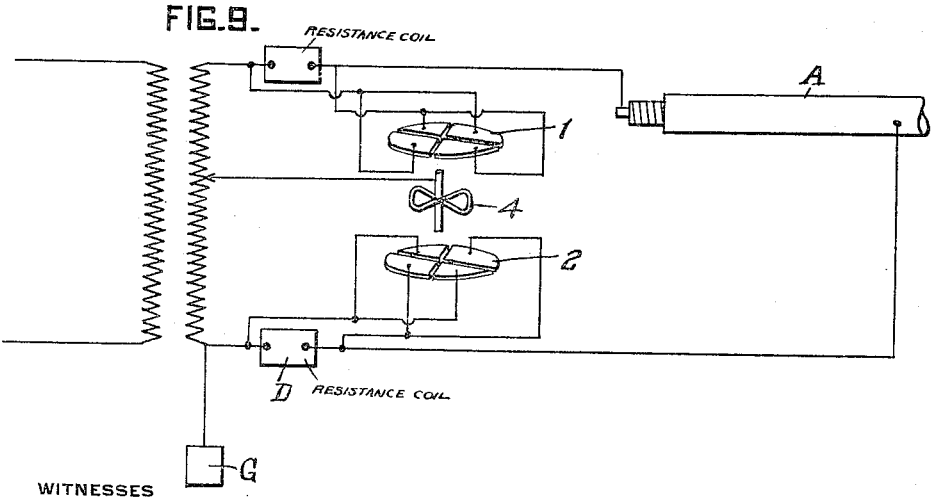
WITNESSES
J. Herbert Bradley.
Francis J. Tomanou
INVENTOR
Charles W. Davis
by Christy and Christy
his attorneys.

UNITED STATES PATENT OFFICE.

CHARLES W. DAVIS, OF EDGEWORTH, PENNSYLVANIA.

WATTMETER.

1,210,609.  Specification of Letters Patent.  Patented Jan. 2, 1917.

Application filed October 19, 1914. Serial No. 867,272.

*To all whom it may concern:*

Be it known that I, CHARLES W. DAVIS, residing at Edgeworth, in the county of Allegheny and State of Pennsylvania, a citizen of the United States, have invented or discovered certain new and useful Improvements in Wattmeters, of which improvements the following is a specification.

My invention relates to the measurement of the energy losses in electric circuits, and consists in improvements in the measuring apparatus employed and in the arrangement of the connections.

Figure 2:
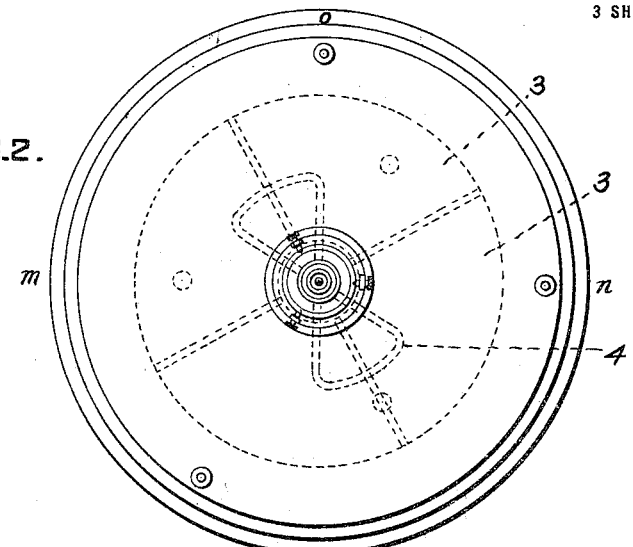
Figure 1:
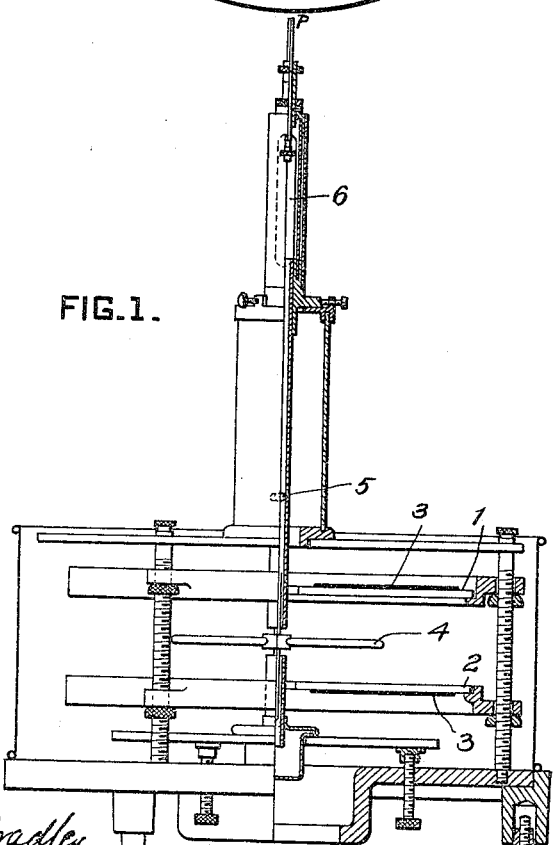
Figure 3:
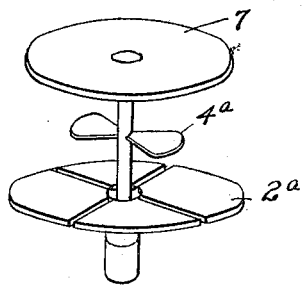
Figure 4:
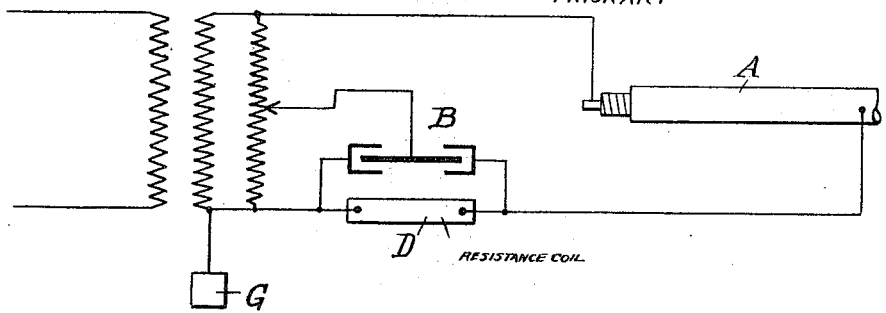
Figure 5:
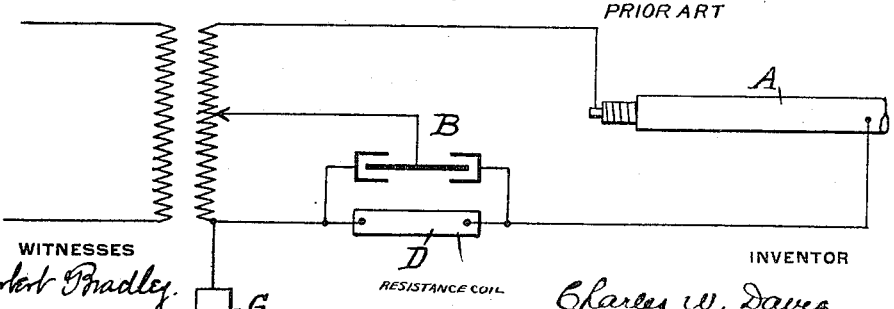

In the accompanying drawings which form part of this specification, Figure 1 is a view partly in side elevation, partly in vertical section of an instrument known as a Kelvin watt meter; Fig. 2 is a plan view of the same instrument; Fig. 3 is a view in perspective (and diagrammatic) of the essential parts of a meter differing from the Kelvin meter in details which constitute specific features of my present invention; Figs. 4 and 5 illustrate diagrammatically the connections which are made when the Kelvin meter is employed in usual manner; Fig. 6 shows the connections which are made when the instrument of Fig. 3 is employed; Figs. 7 and 8 illustrate modifications in the structure of this instrument; and Fig. 9 shows the use of the typical Kelvin meter of Fig. 1 in that arrangement which constitutes the application of my invention in its broader aspect.

The Kelvin meter shown in Figs. 1 and 2 consists essentially of two plates 1 and 2 mounted in parallel opposite positions and, when the instrument is in service, extending in horizontal planes. These plates are formed of insulating material and upon each are mounted four quadrant-shaped plates of conducting material arranged about a center (as best shown in Fig. 2) and the two centers opposite one another (as best shown in Fig. 1). Between the two plates and in a line coincident with the centers of arrangement of the quadrants is suspended a needle 4 which as ordinarily constructed is of the approximately figure-eight shape shown in Fig. 2. A mirror 5 secured to the suspending filament 6 throws a ray of light upon a properly placed scale and thus indicates the degree of deflection of the needle.

This instrument as it has heretofore been used is arranged with relation to the circuit to be measured in the manner indicated in Figs. 4 and 5. These figures show, diagrammatically, a high-tension circuit in which is introduced a specimen of insulated cable. One branch of the circuit is connected to the core of the cable and the other branch to the sheath; and, the difference of potential between the two branches being known, the problem is to measure the energy losses which will occur under such known conditions of voltage in the cable insulation. This problem is given as an example merely; it will be understood that the thing to be measured is the amount of energy expended in a circuit, regardless of the particular way the energy may be consumed.

The eight quadrants of the two quadrant plates of the Kelvin meter are connected to two lead wires, four to each. The two groups are specifically the plates (referring to Fig. 2) which would be intersected by two vertical planes indicated by the lines $m$ $n$ and $o$ $p$. The two lead wires are connected to the opposite poles of a resistance coil introduced in series at some certain point in the circuit. The needle is connected to the circuit at another certain point. When then the circuit is energized, the extent of the deflection of the needle will (but for difficulties to be noted presently) be an index of the energy loss sustained by the current in flowing between those two points in the circuit. Furthermore, the points for meter connections being so selected that the difference in potential subsisting in the meter between quadrant plates and needle is either that of the entire circuit or a known fraction thereof, the actual value of the energy loss in the load is a matter of calculation from the meter readings.

In Figs. 4 and 5 the arrangement of meter connections is shown which has heretofore been found best. The transformer circuit shown is grounded at G; the quadrant plates of the meter are connected to the opposite poles of a resistance coil D introduced in series between ground and the load A. The needle of the meter is connected (Fig. 4) to a shunt or bridge across the transformer coil at a point midway of the length of the bridge, or (Fig. 5) to the transformer coil itself at the midway point. Such midway point of connection is preferred because thus the formula used in calculation is greatly simplified.

In the use of this instrument arranged in the manner which has heretofore been accepted—particularly where very high voltages are attained—difficulties arise: the normal swing of the needle is disturbed by corona discharge along its edges and, furthermore, the needle becomes so unstable that valuable readings are impossible. Such difficulties have in some degree been overcome by rounding the edges of the needle; but the field of practicability is not greatly enlarged. The added weight renders the needle sluggish; and, beyond certain limits in the matter of voltage, the instrument remains of little or no value, except to measure energy losses of extremely steady character. At best, the Kelvin meter has not heretofore been serviceable where the difference of potential between quadrant plates and needle (the medium being air at atmospheric pressure) has exceeded 8,000 or 9,000 volts.

My improved arrangement consists in suspending the needle, not between two plates impressed both with substantially the same voltage, but between plates of different voltage, and in impressing upon the needle a voltage of intermediate magnitude. My improved meter which I preferably (though not necessarily) employ in the practice of my invention differs from the Kelvin meter in certain details. I shall first describe the meter itself. It is shown in perspective in Fig. 3 of the drawings. As here shown, one of the quadrant plates of the Kelvin meter as already described (in this instance the upper one) has been taken away, and replaced by another plate or shield 7, formed wholly of conducting material. It will ordinarily be a rather heavy metal plate with rounded edges or a plate of lighter material with its edges turned to form a heavy rounded bead. In the matter of connections, Fig. 6 shows the needle 4$^a$ impressed as before with the voltage of the midway point in the length of the transformer coil; and it shows the lower plate 2$^a$, a quadrant plate as before, and connected as before in shunt with a resistance D between ground and load; but in place of the upper quadrant plate is the plate 7 already described and it is connected, not with the lower plate, but with the circuit at a point between the transformer coil on its high-tension side and the load.

Comparing the instrument of Fig. 1, as arranged in Fig. 5, with the instrument of Fig. 3, as arranged in Fig. 6, it will be seen that, whereas the needle of the one instrument is impressed with a voltage higher than that of the disks between which it swings, the needle of the other instrument is impressed with a voltage of intermediate value between the low-voltage plate on one side and the high-voltage plate on the other. The intervals between needle and plates should, I believe, be proportional to the differences in voltage—so that the potential which the needle (if unconnected) would naturally assume, in view of its electrostatic relationship with the shield on one side and the quadrant plate on the other, is exactly or approximately that which is impressed upon it. I have found that, whereas the typical Kelvin meter of Fig. 1 arranged in the manner previously recognized is limited in the matter of voltage in consequence of such difficulties as I have indicated, the meter as modified and arranged in the manner illustrated in Fig. 3 is not so limited, but is freed of such difficulty in measuring energy losses of high voltage circuits. Furthermore, the enlargement and rounding of the edges of the moving element is no longer necessary, for the corona discharges against which such measures are preventive are eliminated.

In Fig. 7 I show that my improved meter may be modified in structure, using a central quadrant plate 2$^a$, two needles 4$^a$, one above and one below plate 2$^a$, and two plates 7, one above the upper needle and the other below the lower needle. In Fig. 8 there is one central plate 7, and two quadrant plates 2$^a$ above and below the needles 4$^a$. These and other variants in particular arrangement will retain the essential features of my invention.

In Fig. 9 I show that the Kelvin meter in typical form as shown in Figs. 1 and 2 may be arranged in the manner which constitutes my invention in its broader aspect. In this case the two quadrant plates are connected to the circuit on opposite sides of the load, each quadrant plate wired in the manner heretofore described being connected to opposite poles of a resistance coil introduced in the circuit in series.

It matters not whether the upper plate or the lower one is the high-tension plate. It is essential that a voltage of intermediate value be impressed on the needle, but manifestly while it is convenient to take the voltage for the needle from the circuit itself, a voltage of proper value might be impressed on the needle from any source of voltage and the invention would remain and its benefit be enjoyed.

While I have shown and described a Kelvin meter and also my improvement upon the Kelvin meter as suitable measuring instruments, it will be understood that my invention in its broadest aspect is not confined to the use of an instrument of such type or to an instrument of any particular type. The desired end may be gained in the use of any suitable instrument arranged in the circuit in the position I have described and capable when so placed of giving an intelligible record of differences in potential impressed upon it.

I claim as my invention:

1. In an apparatus for measuring the energy loss of an electric circuit, the combination with the circuit to be measured, of a resistance coil arranged in series in the said circuit, an electrometer including two elements of which one is connected to the poles of the said resistance coil and the other is arranged opposite the first and impressed with the voltage of the circuit on the side of the load opposite that of the connection of the first element; and a needle arranged between said elements and impressed with a voltage of intermediate value.

2. In an apparatus for measuring the energy loss of an electric circuit, the combination, with the circuit to be measured, of a resistance coil arranged in series in the said circuit, an electrometer including two elements of which one is connected to the poles of the said resistance coil, and the other is arranged opposite the first and impressed with the voltage of the circuit on the side of the load opposite that of the connection of the first element, and a needle impressed with a voltage of intermediate value and arranged between the two said elements and spaced from them at relative distances corresponding to the voltage ratio.

3. In an apparatus for measuring the energy loss of an electric circuit the combination of a quadrant plate a homogeneous circular plate of conducting material arranged concentrically with and opposite to said quadrant plate, and a needle suspended between the two said plates.

4. In an apparatus for measuring the energy loss of an electric circuit the combination of a suspended double needle a plate extending between the two parts of the said needle, two plates extending parallel with the plate first named, one above the upper needle and the other beneath the lower, one type of plate being the quadrant type and the other a homogeneous circular plate of conducting material, and all of said plates being concentrically arranged.

5. In an electrostatic watt meter the combination of a high-tension plate and a low-tension plate one of said plates consisting essentially of symmetrically disposed and individually insulated quadrants of conducting material, and of a needle suspended between said plates.

6. In combination with a transformer a grounded transformer circuit, and a load whose watt losses are to be measured, of a resistance coil connected in series between ground and load, a quadrant plate connected to opposite poles of said resistance coil, a second plate arranged opposite said quadrant plate, connection to said second plate from the circuit on the high-tension side of said load, an index-member supported between said plates, and connection to said index member from said transformer at a point intermediate in the length of the coil thereof.

7. In an apparatus for measuring the energy loss of an electric circuit the combination of a quadrant plate, a homogeneous plate of conducting material arranged opposite said quadrant plate and a needle suspended between the two said plates, the said plate of conducting material being symmetrically arranged with respect to the said needle.

8. In an apparatus for measuring the energy loss of an electric circuit, the combination, with the circuit to be measured, of an impedance arranged in series in the said circuit, a quadrant plate, a homogeneous plate of conducting material arranged, opposite said quadrant plate, and a needle suspended between the two said plates, the said quadrant plate being connected across the ends of the said impedance, and said homogeneous plate being impressed with the voltage of the circuit at a point remote from said impedance.

In testimony whereof I have hereunto set my hand.

CHARLES W. DAVIS.

Witnesses:
 PAUL N. CRITCHLOW,
 FRANCES J. TOMASSON.

Copies of this patent may be obtained for five cents each, by addressing the "Commissioner of Patents, Washington, D. C."